United States Patent
Yang et al.

(10) Patent No.: US 11,651,158 B2
(45) Date of Patent: May 16, 2023

(54) ENTITY RESOLUTION FOR CHATBOT CONVERSATIONS

(71) Applicant: salesforce.com, inc., San Francisco, CA (US)

(72) Inventors: Xinyi Yang, San Mateo, CA (US); Tian Xie, Los Altos, CA (US); Caiming Xiong, Menlo Park, CA (US); Wenhao Liu, Redwood City, CA (US); Huan Wang, Fremont, CA (US); Jin Qu, Sunnyvale, CA (US); Soujanya Lanka, Singapore (SG); Chu Hong Hoi, Singapore (SG); Xugang Ye, Bellevue, WA (US); Feihong Wu, Santa Clara, CA (US)

(73) Assignee: Salesforce, Inc., San Francisco, CA (US)

( * ) Notice: Subject to any disclaimer, the term of this patent is extended or adjusted under 35 U.S.C. 154(b) by 136 days.

(21) Appl. No.: 16/993,256

(22) Filed: Aug. 13, 2020

(65) Prior Publication Data

US 2022/0050966 A1    Feb. 17, 2022

(51) Int. Cl.
| | | |
|---|---|---|
| *G10L 15/05* | (2013.01) | |
| *G06F 40/295* | (2020.01) | |
| *G06F 40/35* | (2020.01) | |
| *G06N 3/04* | (2023.01) | |
| *H04L 51/02* | (2022.01) | |

(52) U.S. Cl.
CPC ............ *G06F 40/295* (2020.01); *G06F 40/35* (2020.01); *G06N 3/04* (2013.01); *H04L 51/02* (2013.01)

(58) Field of Classification Search
CPC ....................................................... H04L 51/02
See application file for complete search history.

(56) References Cited

U.S. PATENT DOCUMENTS

| | | | |
|---|---|---|---|
| 10,607,042 B1 | 3/2020 | Dasgupta et al. | |
| 10,698,707 B2 | 6/2020 | Martin | |
| 10,916,242 B1 * | 2/2021 | Sima | ..................... G10L 15/063 |
| 11,238,232 B2 * | 2/2022 | Sapugay | ................. G06F 40/30 |
| 11,380,306 B2 * | 7/2022 | Mallinar | ................. G06F 40/35 |

(Continued)

OTHER PUBLICATIONS

PCT International Search Report and Written Opinion, PCT Application No. PCT/US2021/013779, dated May 7, 2021, 12 pages.

(Continued)

*Primary Examiner* — Neeraj Sharma
(74) *Attorney, Agent, or Firm* — Fenwick & West LLP (57) ABSTRACT

A system performs conversations with users using chatbots customized for performing a set of tasks. The system may be a multi-tenant system that allows customization of the chatbots for each tenant. The system receives a task configuration that maps tasks to entity types and an entity configuration that specifies methods for determining entities of a particular entity type. The system receives a user utterance and determines the intent of the user using an intent detection model, for example, a neural network. The intent represents a task that the user is requesting. The system determines one or more entities corresponding to the task. The system performs tasks based on the determined intent and the entities and performs conversations with users based on the tasks.

20 Claims, 6 Drawing Sheets

(56) References Cited

U.S. PATENT DOCUMENTS

| | | | |
|---|---|---|---|
| 2014/0278355 A1* | 9/2014 | Sarikaya | G06F 40/30 |
| | | | 704/9 |
| 2018/0114124 A1* | 4/2018 | Cronn | G04G 21/00 |
| 2019/0179903 A1 | 6/2019 | Terry et al. | |
| 2020/0104362 A1* | 4/2020 | Yang | G06N 3/08 |
| 2020/0184307 A1* | 6/2020 | Lipka | G06N 3/0472 |
| 2020/0302019 A1* | 9/2020 | Hall | G10L 15/22 |
| 2020/0320978 A1* | 10/2020 | Chatterjee | G10L 15/1822 |
| 2021/0004390 A1* | 1/2021 | Li | G06F 16/35 |
| 2021/0082424 A1* | 3/2021 | Johnson | G06N 3/04 |
| 2021/0089624 A1* | 3/2021 | Bealby-Wright | G06N 3/08 |

OTHER PUBLICATIONS

Amazon, "Setting up AWS Chatbot," Date Unknown, two pages, [Online] [Retrieved on Dec. 8, 2020] Retrieved from the Internet <URL: https://docs.aws.amazon.com/chatbot/latest/adminguide/setting-up.html>.

Google, "Google Apps Script bot," Dec. 7, 2020, four pages, [Online] [Retrieved on Dec. 8, 2020] Retrieved from the Internet <URL: https://developers.google.com/hangouts/chat/quickstart/apps-script-bot>.

Parr, B., "Introducing Octane AI, The Easiest Way to Create a Bot," Nov. 2, 2016, eight pages, [Online] [Retrieved on Dec. 8, 2020] Retrieved from the Internet <URL: https://medium.com/@benparr/introducing-octane-ai-the-easiest-way-to-create-a-bot-1b5b9615405>.

Schlicht, M., "The Complete Beginner's Guide to Chatbots," Apr. 20, 2016, 22 pages, [Online] [Retrieved on Dec. 8, 2020] Retrieved from the Internet <URL: https://chatbotsmagazine.com/the-complete-beginner-s-guide-to-chatbots-8280b7b906ca?gi=9ff4477a51cc>.

* cited by examiner

ENTITY RESOLUTION FOR CHATBOT CONVERSATIONS

BACKGROUND

Field of Art

This disclosure relates in general to chatbot conversations an online system, and in particular to entity resolution for chatbot conversations in online systems.

Description of the Related Art

Online systems often user chatbots for interacting with users. A chatbot provides an automated conversational interface for users of the online system. Chatbots allow users to interact with the online system in a natural way, for example, using voice and natural language. For example, a user may be able to ask the online system to perform certain tasks using the chatbot. Chatbots are also referred to as conversational assistants, artificial intelligence (AI) assistants, intelligent virtual assistants, virtual agents, and so on.

Artificial intelligence based chatbots may receive user utterances that may be provided as voice signals and use automated speech recognition techniques to recognize the sentences in the user utterances. A chatbot may analyze natural language sentences using artificial intelligence techniques including machine learning based models, for example, artificial neural networks such as convolutional neural networks, recurrent neural networks, or multi-layer perceptrons.

To perform a conversation with a user, the system may need to determine entities referring to various values extracted from the user utterance that may be used by the system to performs specific tasks. For example, if the user is requesting information describing a record, the system may need to analyze user utterances to determine which record needs to be accessed. The system may identify the record based on entities mentioned by the user representing values such as the name of the user, a timestamp associated with the record, an identifier associated with the record and so on. Incorrect determination of these values may result in the system providing an incorrect record to the user.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

An online system allows users to perform tasks using customized chatbots. The chatbot may be customized for letting users perform a specific set of tasks. For example, the online system may be a multi-tenant system that hosts data and services for multiple tenants. Each tenant of the multi-tenant system may represent an enterprise that performs a specific set of tasks for users. Each tenant may customize a chatbot for execution by the multi-tenant system and use by users of the tenant. The online system receives utterances of users through chatbot conversations and determines the intent in each utterance. The intent corresponding to an utterance determines the task that the user requests the online system to perform. The online system resolves entities in the user utterances to determine values that are used for performing the tasks. The online system may also be referred to herein as a system.

The system performs the following process for entity resolution in a user utterance. The system receives a task configuration mapping tasks to entity types and an entity configuration mapping entity types to methods for determining entities of each entity type. The task configuration and entity configuration customize the chatbot to perform a set of tasks in the online system. The system receives a user utterance in a chatbot conversation. The user utterance comprises a natural language sentence. The system predicts an intent of the natural language sentence using an intent detection model. The intent represents a task requested by the user via the natural language sentence. The system identifies entity types corresponding to the requested task from the task configuration. For each identified entity type the system determines an entity of that entity type by executing methods corresponding to the entity type specified in the entity configuration. If all entities needed for performing a task are determined, the system performs the requested task. The system may send a response based on the performed task to the user in the chatbot conversation. For example, if the user requested status of a transaction, the system may perform the task by identifying one or more entities for uniquely identifying the transaction, accessing a database to retrieve the status of the transaction, and sending a response to the user informing the user of the status.

System Environment

Figure 1:
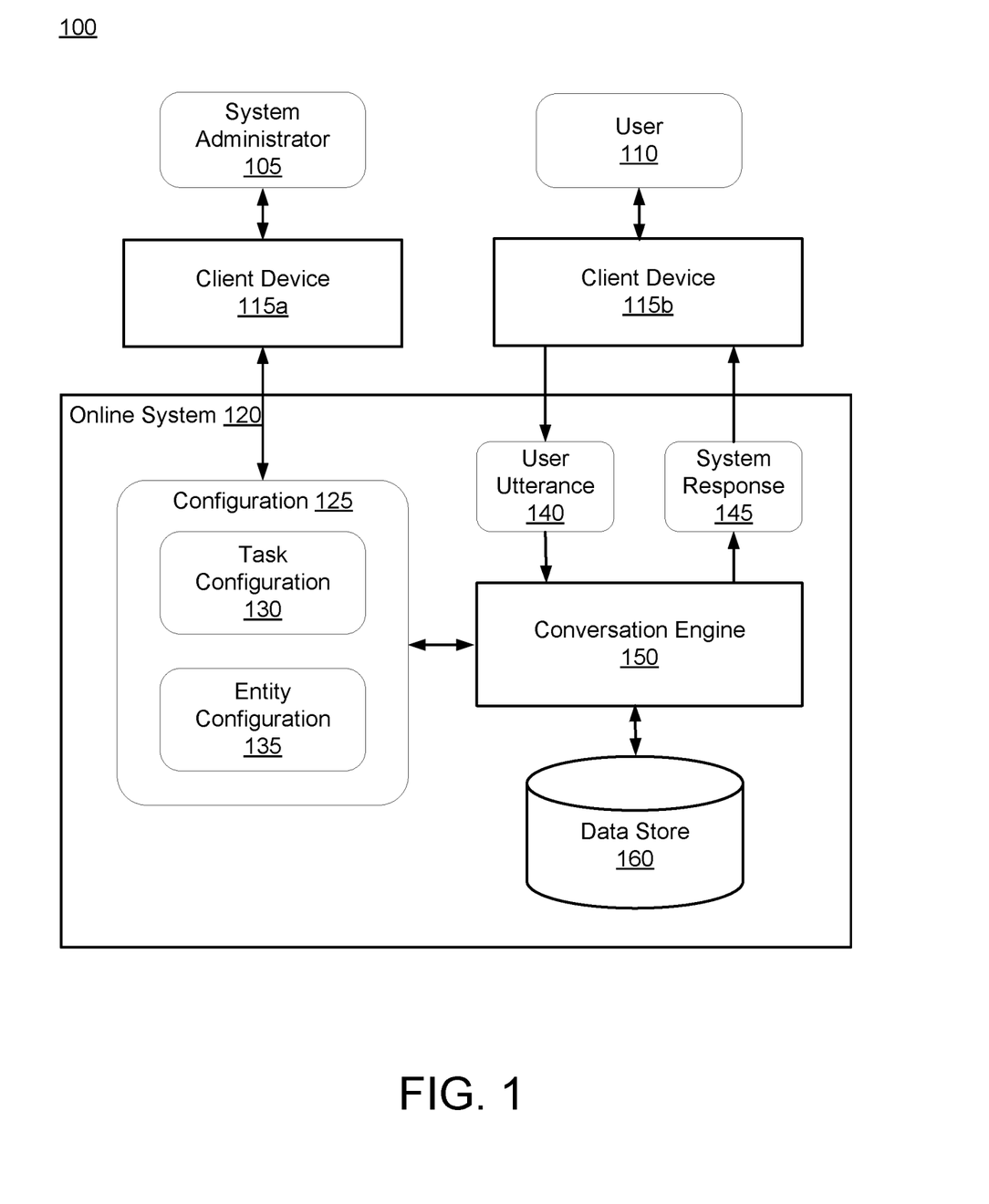
FIG. 1 is a block diagram of a system environment 100 for performing chatbot conversations, according to an embodiment.

FIG. 1 is a block diagram of a system environment 100 for performing chatbot conversations according to an embodiment. The system environment 100 includes an online system 120 that communicates with users via client devices 115. The online system 120 includes a conversation engine 150 and a data store 160. The online system 120 may include other components not shown in FIG. 1, for example, other types of data stores, external system interfaces, and so on. The system environment 100 may include other elements not shown in FIG. 1, for example, a network. The online system 120 may be referred to herein as a system.

Users 105, 110 of the online system 120 interact with the online system using client devices 115. Some users may be privileged users, for example, system administrators 105 that maintain and configure the online system 120. Other users 110 simply use the functionality provided by the online system, for example to perform various tasks supported by the online system.

The conversation engine 150 uses chatbots to perform conversations with users 110. The online system 110 allows system administrators 150 to customize the chatbots using a chatbot configuration 125. As shown in FIG. 1, a system administrator 105 may use a client device 115a to provide the chatbot configuration 125 to the online system 120. The chatbot configuration configures and customizes the chatbots used by the conversation engine 150. A chatbot may be customized to allow users to perform a specific set of tasks. An enterprise that performs certain types of transactions may customize the chatbot to allow users to have conversations with the online system 120 to perform tasks related to the transactions, for example, perform authentication, execute a transaction, check status of a transaction, and so on.

In an embodiment, the chatbot configuration 125 includes task configuration 130 and entity configuration 135. The task configuration 130 specifies the tasks that can be performed by users using the chatbot. The entity configuration 135 specifies information describing entities that represent various values that are needed for performing the tasks. For example, to check status of an order, the online system 120 needs the order id or one or more values to identify the order, for example, the date the order was placed, the account used to place the order. These values are referred to as entities mentioned during the conversation. The entity configuration 135 specifies methods for determining values of the entity.

Figure 2:
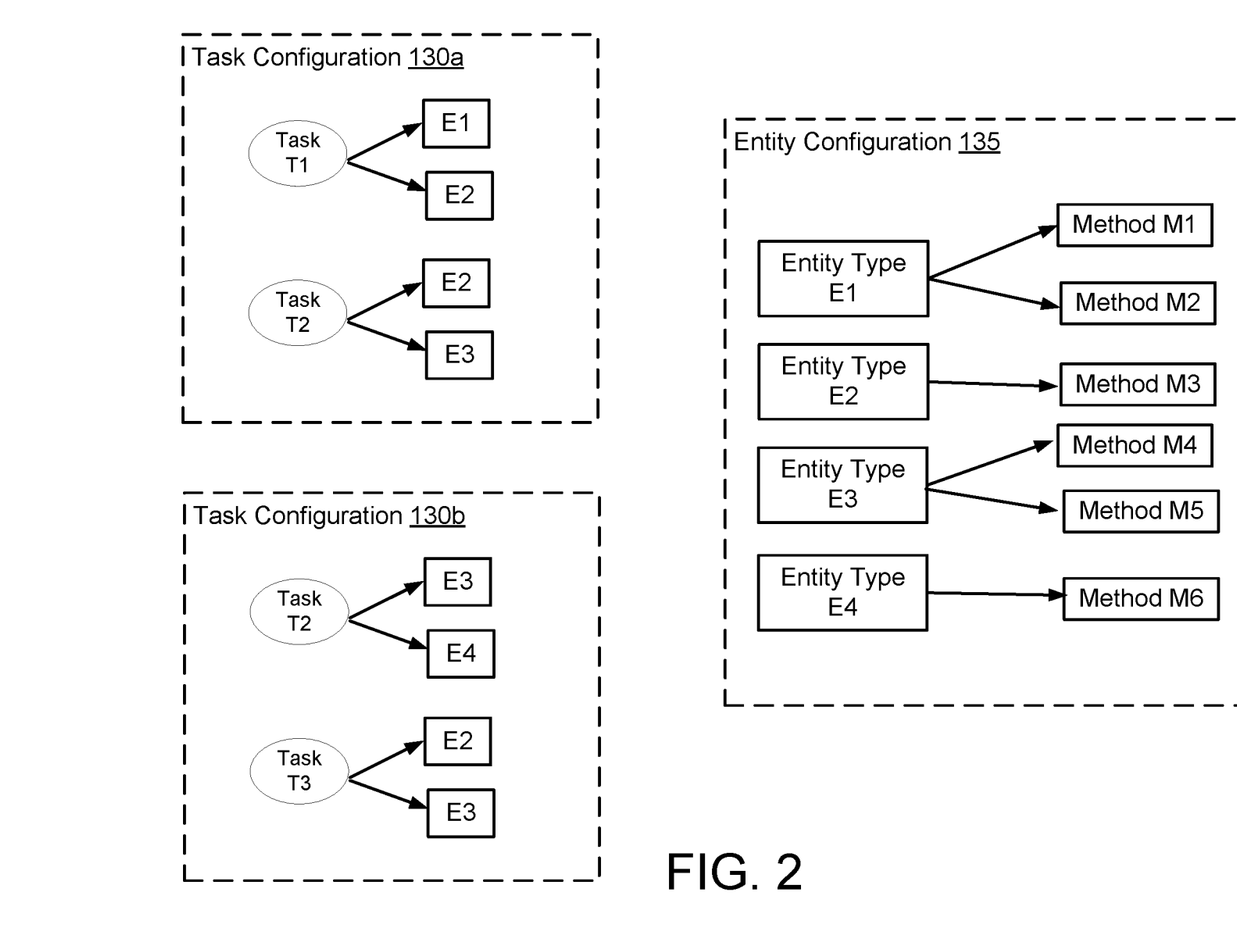
FIG. 2 shows examples of task configurations and entity configurations, according to an embodiment.

FIG. 2 provides an illustrative example of task configurations 130 and entity configuration 135. For each task, the task configuration specifies a set of entities that are relevant for performing the task. The values represented by entities may be provided by the user or may be determined by the conversation engine 150, for example, by accessing the data store 160 or by invoking certain services, for example, web services. For example, if the task represents retrieving the status of an order, the entities relevant to the task include the order ID and the status of the order itself. The conversation engine 150 may obtain the order ID from the user, for example, by generating a question to request the order ID or requesting information such as date of the order that can be used to access the order ID. The conversation engine 150 may access the order status from the data store 160 and provide the order status information to the user.

The conversation engine 150 performs conversations with users 110 according to the configuration 125. The conversation engine 150 receives user utterances 140 and performs tasks based on the user utterances. The conversation engine 150 may interact with the data store 160 to perform the task, for example, to access information stored in the data store 160 or to update information stored in the data store 160. The conversation engine 150 may generate a system response 145 and provide to the user. The system response 145 may be sent to the user to request additional information required to perform the task. The system response 145 may inform the user that the task is completed or provide the user with requested information.

In some embodiments, the online system 120 is a multi-tenant system that allows multiple tenants to use the system, each tenant representing a group of users. The term tenant refers to an organization or enterprise that is a customer of the multi-tenant system. As an example, a tenant may be a company that employs sales people that use the multi-tenant system to manage their sales processes. The term tenant can refer to the set of users of the entire organization that is the customer of the multi-tenant system or to a subset of users of the organization. Accordingly, embodiments allow tenant-specific chatbots that may be customized for a set of users, for example, the entire set of users of the organization, a specific group of users within the organization, or an individual user within the organization. The multi-tenant system stores data of multiple tenants and allows tenants to share applications running on the multi-tenant system. The multi-tenant system may run various applications that tenants are allowed to execute.

The data store 160 stores data for users of the online system 120. A multi-tenant system may store data for multiple tenants in the same physical data store, for example, data store 160 but enforce a logical separation of data across tenants. As a result, one tenant does not have access to another tenant's data, unless such data is expressly shared. The data store 160 may be implemented as a relational database storing one or more tables.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the online system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

FIG. 2 shows examples of task configurations and entity configurations used for customizing chatbots, according to an embodiment. In an embodiment, the online system 120 presents a user interface for a system administrator to provide information that may be stored in a configuration file storing the task configurations and entity configurations. As shown in FIG. 2, multiple task configurations 130 may be specified, each task configuration file for a specific chatbot customized for a set of tasks. For example, the task configuration 130a specifies configurations for tasks T1 and T2, whereas task configuration 130b specifies configurations for tasks T2 and T3.

Each task configuration specifies among other details, the entities relevant to performing the task. For example, as specified in task configuration 130a task T1 uses entities E1 and E2, whereas task T2 uses entities E2 and E3. The specification of a task in two different configuration files may be different. Accordingly, different entities may be specified as being associated with the same task in two different task configurations. For example, task configuration 130b specifies that task T2 uses entities E3 and E4 whereas configuration 130b specifies that task T2 uses entities E2 and E3.

The entity configuration 135 specifies methods for different entity types. For example, entity configuration 135 specifies entity types E1, E2, E3, and E4. Furthermore, entity configuration 135 specifies methods M1 and M2 for processing entity type E1, method M3 for processing entity type E2, methods M4 and M5 for processing entity type E3, and method M6 for processing entity type E4. In an embodiment, an entity configuration be specified independent of task configurations. Accordingly, the entity configuration will be used independent of the task configuration used by a chatbot. In other embodiment, an entity configuration may be specific to a task configuration. Accordingly, the entity configuration is used whenever a chatbot is using the corresponding task configuration. In an embodiment, the system may use a combination of task specific entity configurations and task independent configurations. For example, some entity types may be specified independent of task configurations and some entity types specified for specific task configurations.

In an embodiment, the same entity type may have one configuration in a task independent entity configuration and another configuration in a task specific entity configuration. The task specific entity configuration identifies a specific task for which the entity configuration is specified, for example, the task specific entity configuration may specify an entity configuration for entity type E1 for task T1. The task specific entity configuration is used if a chatbot is using that task, for example, task T1. The same entity type may be used for other tasks, for example, task T2 and T3. For chatbots using task configurations specify other tasks such as tasks T2 and T3, the entity specification from the task independent entity configuration is used.

Following is an example of a task configuration that specifies a task check_order. Although following example shows only one task, a task configuration may specify any number of tasks.

```
check_order:
description: check your order status
samples:
   I have not received the ordered item yet
   The ordered item has not yet delivered
   is my ordered item on the way?
   i want to check order
   my order status
entity_types:
E1
   order_status
E2:
   oid
success:
AND:
   TASK:
      verify_user
   INFO:
      E1
   QUERY:
      E2
```

The configuration of the task includes a description, one or more samples, one or more entity types, and a success criterion. The samples specify examples of natural language sentences that may be used by a user requesting that particular task. The entity types identify entities that are relevant to that task. The success criterion may be a logical expression that specifies the processing that needs to be performed to successfully complete the task. The processing may include other tasks that need to be performed and entities that need to be determined. If the expression describing success of the task is an OR operation performed on E1 and E2, the task is completed if either E1 or E2 is evaluated successfully. Accordingly, an OR expression evaluates successfully if any one of the sub-expressions of the OR expression evaluates successfully. An AND expression evaluates successfully if all sub-expressions of the AND expression evaluate successfully indicating the user verified that part of authentication successfully.

The online system supports a set of entity actions that can be specified in the task configuration. For example, the task configuration may specify an entity action INFO specifying that the online system provides the entity information. The entity action QUERY specifies that the online system will search entity based on information that the user provided. Similarly, the entity action INSERT specifies that the online system will insert a record based on information provided by user. The entity action DELETE specifies that the online system will delete a record identified based on information provided by user. The entity action UPDATE specifies that the online system will update a record identified based on information provided by the user. Similarly, the system may support other actions. A user may define an entity function, for example, using a function or method specified using a programming language. These are example, entity actions. Other embodiments can support other entity actions. Furthermore, each entity action may be defined in ways other than those indicated herein.

Following is an example of an entity configuration file. This is a task specific entity configuration that is used while performing a task, for example, verify_user task. The entity configuration specifies two entity types email_address and zip_code. For each entity type, the entity configuration specifies the value of the type of the entity, one or more methods associated with the entity, and a confirm flag. The confirm flag specifies whether the system should confirm with the user if the value determined for the entity is correct. For example, the conversation engine may ask a question such as "Do you mean the email address is abc@email.com?" For entity type email_address, the type specified is "email", a single method "spelling" is specified, and the confirm flag has value "yes". For entity type zip_code, there are four methods specified, named entity recognition (ner), spelling, regular expression (regex), and fuzzy matching.

```
verify_user:
   email_address:
      type:
         EMAIL
      method:
         SPELLING
      confirm: yes
   zip_code:
      type:
         CARDINAL
      methods:
         ner:
         spelling:
         regex:\d{5}
         fuzzy_matching:
            94301
            94305
      hints:
         type:
            INT
         other_parameters
            address
            ner
      Prompt:
         Could you please provide your zipcode?
      confirm: yes
      function: funcGetWeather
      response:
```

In some embodiments, the task configuration specifies a user defined entity function. The user defined entity function may be specified using a language, for example, a programming language such as PYTHON. For example, the above example task configuration specifies a function funcGetWeather that checks weather for the zip code corresponding to the entity zip_code. The function funcGetWeather may include instructions to interact with a web service that provides weather information. The function funcGetWeather can be invoked by the conversation engine during a conversation with a user to provide weather condition for a particular zip code.

In an embodiment, the entity configuration specifies a "response" attribute that defines the response provided by the conversation engine to the user during a conversation. The response is provided by the conversation engine after the online system processes the entity that specifies the "response" attribute. In an embodiment, the "response" attribute specifies a template that includes a value associated with the entity. For example, the "response" attribute for the example "zip_code" entity show above may specify that the output of the funcGetWeather is appended to a string "The weather currently is" and provide to the user in response to the user question. Accordingly, the "response" attribute allows a user to customize a response associated with an entity. If the entity configuration does not specify a "response" attribute, the conversation engine may use a default response, for example, a statement such as the string "The value is" appended to the entity value. Similarly, the attribute "prompt" allows the user to customize the prompt that is presented to the user when the conversation engine requests a value from the user instead of using a default prompt.

The instructions for each method may be stored in a file and accessed for processing the entity. The system may perform certain checks associated with the type of the entity type to make sure that the value determined conforms to the type. For example, the type EMAIL may specify a specific format.

In some embodiments, the entity configuration specifies questions as templates that include combinations of text strings and values. For example, the entity configuration may specify a question ""What is"+entity_name". The conversation engine generates a question based on the template for asking to the user. The conversation engine 150 stores a set of default templates for generating questions for asking users. The conversation engine 150 checks the entity configuration to determine if the entity configuration specifies a template for a question for a particular context. If the entity configuration specifies a template for a question for that particular context, the conversation engine 150 uses the template from the entity configuration, or else the conversation engine 150 uses a default template.

An example of a context is the user providing a value for an entity type that is invalid. The conversation engine processes the received value to determine a type of error in the received value. The entity configuration specifies a template for a question for a specific type of error. If the error is format error caused by incorrect format of the entity value, the conversation engine uses a template that provides format information for the entity type in the question. For example, if the user utterance provided an order number that has invalid format, the conversation engine generates the following question and asks the user "The order number is a combination of 3 characters and 3 digit numbers, could you please provide a valid order number?" Accordingly, the entity configuration includes a set of questions for obtaining entity values during a chatbot conversation.

System Architecture

Figure 3:
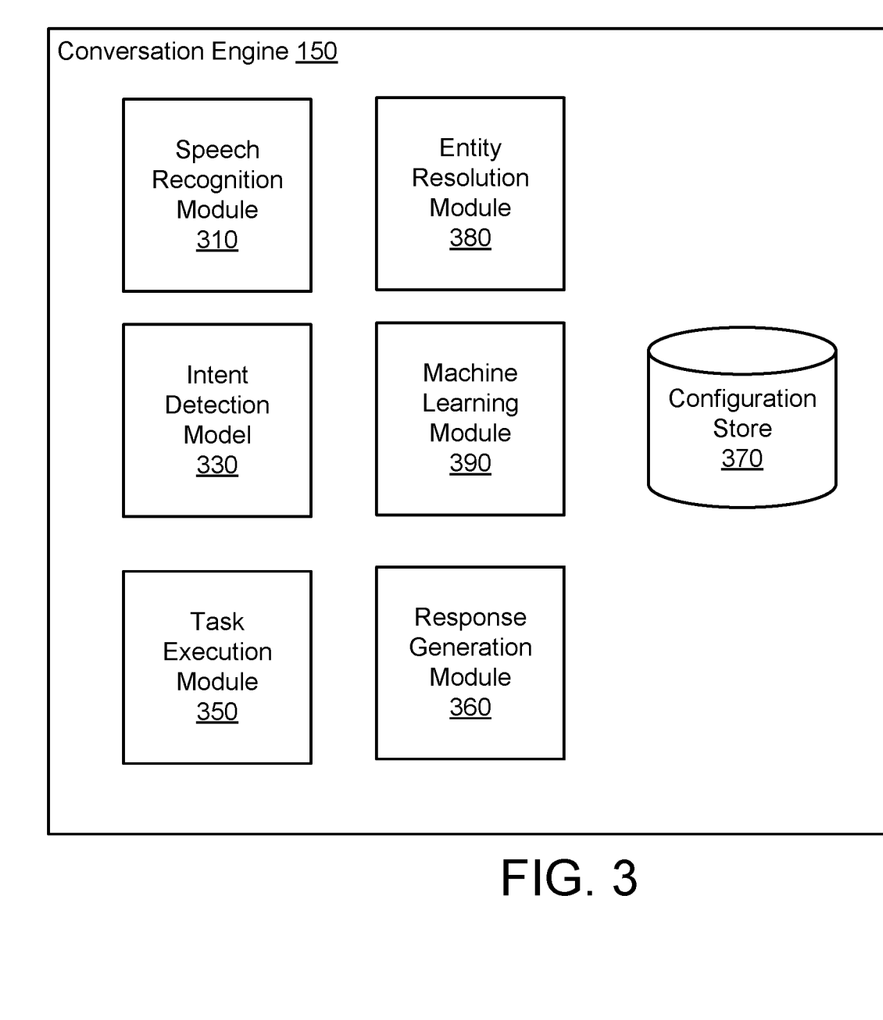
FIG. 3 is a block diagram of a system architecture of a conversation engine, according to an embodiment.

FIG. 3 is a block diagram of a system architecture of a conversation engine, according to an embodiment. The online system 120 comprises a speech recognition module 310, an intent detection model 330, a task execution module 350, a response generation module 360, a configuration store 370, and an entity resolution module 380. Other embodiments can have different and/or other components than the ones described here. Furthermore, the functionalities described herein can be distributed among the components in a different manner.

The online system allows users to customize chatbots by specifying chatbot configurations. The chatbot configurations are stored in the configuration store 370. A chatbot configuration may be received as a configuration file, for example, an XML, or a YML file.

The conversation engine 150 allows users to perform tasks using the online system 120. For example, if the online system implements an e-commerce website, the conversation engine 120 to allow users to perform tasks related to transactions, for example, execute an online transaction, check status of a transaction, and so on. The tasks are performed by the task execution module 350. The task execution module 350 may interact with other components, for example, with the data store 160 to access data or update data necessary for executing a task. The task execution module 350 may interact with external services, for example, a map service to confirm an address.

In an embodiment, the task execution module 350 maintains a data structure storing a set of tasks. For example, the data structure may be a queue data structure or a stack data structure. If the task execution module 350 needs to execute a task, the task execution module 350 stores a task object on the data structure. The task object specifies a type of task and slots for storing various entities required for executing the task. The task execution module 350 obtains a task from the task data structure and processes it. The task configuration may specify that performing a task requires execution of other related tasks. Accordingly, for executing a task, the task execution module 350 may add other tasks to the task data structure. The task execution module 350 keeps processing tasks on the task data structure until all tasks are executed.

The conversation engine 150 performs natural language conversations with users. The conversation engine 150 receives utterances from users. The utterances may be provided as text signals via a user interface that allows users to input text. The utterances may be provided as voice signals via a user interface that allows users to speak into a microphone that captures the voice signal. The conversation engine 150 may ask questions to users for receiving information and receives natural language answers from users. The conversation engine 150 generates dialogs that are presented to the user. The conversation engine tracks state of a conversation to make sure that various questions are answered. The conversation engine 150 provides the answers received from users to various modules of the authentication module 150. If the user is using a voice based interface for the conversation, the conversation engine 150 uses the speech recognition module 310 to convert the audio signal received to text for further processing.

The speech recognition module 310 receives audio signal as input and converts the audio signal into text for further processing. The speech recognition module 310 allows a user to use voice for conducting conversations with the online system 120. The output of the speech recognition module 310 is provided as input to other modules of the online system 120. In an embodiment, the speech recognition module 310 provides a confidence level for a word that is recognized indicating a likelihood that the word was transcribed correctly.

The entity resolution module 380 identifies an entity that is related to a permitted action that is requested by a user. An entity refers to a value that the system determines to execute a task. For example, to execute a task for verifying a user, the system may determine one or more of, a name of the user, a zip code of the user, an email of the user, and so on. To retrieve a record of a transaction, the system may need information to uniquely identify the record, for example, a date and time stamp associated with the transaction, a record identifier, and so on. The task configurations specify the types of entities that are required to perform a task. The entity resolution module 340 executes the various processes described herein, for example, in FIGS. 4-5.

The entity resolution module 380 may execute different methods for recognizing an entity of an entity type, as specified in the entity configuration. For example, in the above example configuration of zip_code entity type, four methods are specified, named entity recognition, spelling, regular expression, and fuzzy matching.

The entity resolution module 380 performs named entity recognition by providing the sentence to a named entity recognition model that receives a sentence as input and identifies one or more named entities and their types. Named entities are entities that are associated with a set of pre-defined categories, for example, person names, organizations, locations, time expressions, quantities, monetary values, percentages, and so on. In an embodiment, the named entity recognition model is a neural network that is trained using sentences with known named entities. As an example, for an example, input sentence "I want a television to be delivered to San Jose by end of the week" the named entity recognition model recognizes the following categories of named entities and their values: category product, value "television"; category time, value "end of week"; and category location, value "San Jose."

The entity resolution module 380 executes the spelling method for entity recognition by providing the spelling to the user of the entity and asking the user to confirm or by asking the user to spell out the entity. The entity resolution module 380 executes the regular expression method for entity recognition by matching various portions of the input sentence against regular expressions specified in the entity configuration and selecting a portion of the sentence that matches the regular expression. The entity resolution module 380 executes the fuzzy matching method for entity recognition by performing a fuzzy match of portions of the input sentence against sample expressions specified in the entity configuration. If a portion of the sentence is determined to have a high degree of match with an example based on a fuzzy match, the entity resolution module 380 determines that the portion of sentence is of the entity type for which the method was specified in the entity configuration.

According to an embodiment, the neural network is configured to receive as input a natural language sentence and an example phrase and determine whether the example phrase can be inferred from the natural language sentence. An example phrase can be inferred from a natural language sentence if the natural language sentence implies the example phrase. The example phrase may be another natural language sentence or a portion of a natural language sentence.

In an embodiment, the neural network generates a confidence score indicating a measure of confidence that the example phrase can be inferred from the natural language request. For example, a higher measure of confidence indicates a higher likelihood that the example phrase can be inferred from the natural language request. Given two example phrases, the scores generated by the neural network for a natural language sentence can be compared to determine which example phrase reflects the intent of the natural language request better. Furthermore, given a set of example phrases, the neural network can be executed using pairs of the natural language sentence and example phrases from the set as input to generate scores. The scores can be compared to determine the beast matching example phrase that represents the intent of the natural language sentence. The neural network may be trained using labelled training data set storing pairs of natural language sentences and example phrases that can be inferred from them.

The machine learning module 390 trains the intent detection model 330. In an embodiment, the machine learning module 390 trains the intent detection model 330 using labeled data set comprising several pairs of natural language requests and corresponding example phrases. The example phrases corresponding to an intent may be specified in a task configuration 130 provided by a system administrator.

Processes for Recognizing Entities

Figure 4:
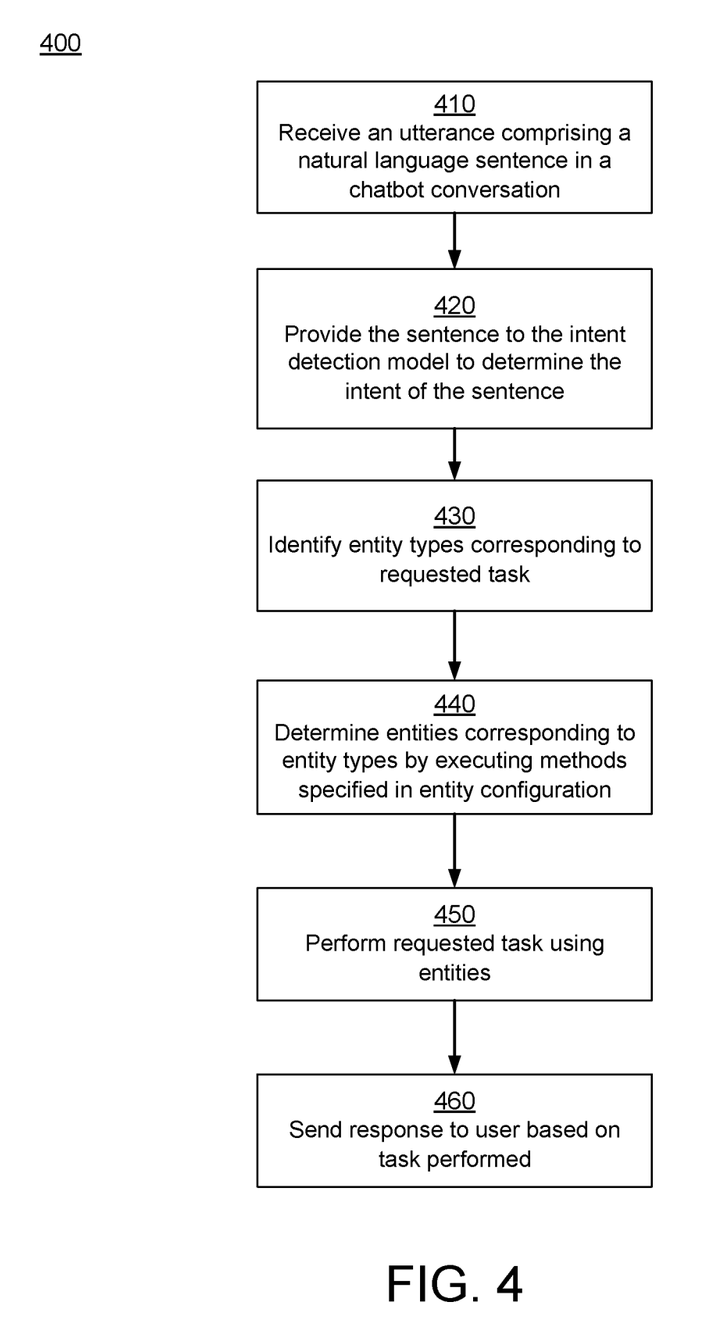
FIG. 4 is a flow chart illustrating the process of recognizing entities, according to an embodiment.
Figure 5:
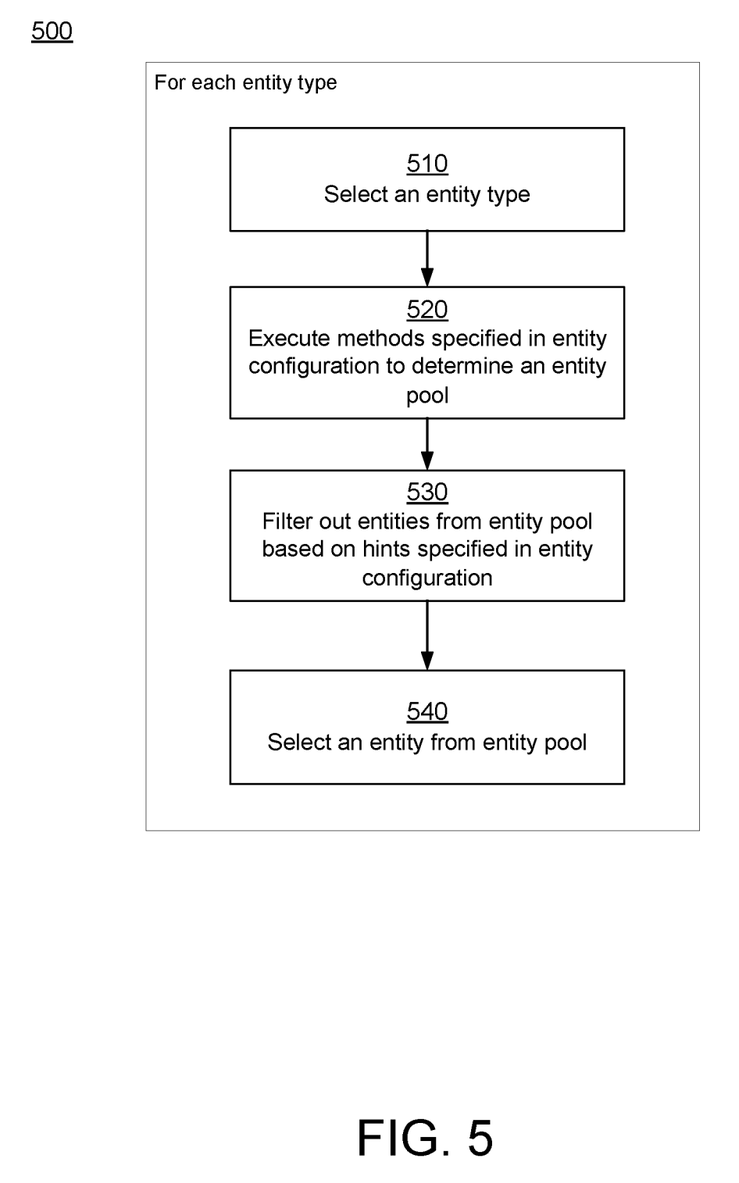
FIG. 5 is a flow chart illustrating the process of selecting entities from entity pools, according to an embodiment.

Processes related to entity recognition are illustrated in FIGS. 4-5. Other embodiments can perform the steps of these flowcharts in different orders. Furthermore, various embodiments can include different and/or additional steps than the ones described herein.

FIG. 4 is a flow chart illustrating the process of recognizing entities, according to an embodiment. The conversation engine 150 receives 410 an utterance from a user in a chatbot conversation. The utterance comprises a natural language sentence. The conversation engine 150 provides the sentence to the intent detection model 330 to determine the intent of the sentence. The intent represents a task that the user is requesting the system to perform via the chatbot conversation. The intent detection model 330 compares the received natural language sentence to example phrases or sentences to determine matching example phrases sentences that correspond to an intent according to the task configuration.

The conversation engine 150 identifies 430 the entity types corresponding to the requested task from the task configuration. The conversation engine 150 determines 440 the entities corresponding to the entity types by executing methods corresponding to each entity type specified in the entity configuration.

The online system 120 performs the requested task based on the determined entity values. The online system 120 sends a response to the user based on the performed task. If the requested task represents some information stored in the data store 160, the online system 120 provides the requested information to the user. For example, the user may request the status of an order, or the price of a product or service and the online system provides the requested information. As another example, the online system 120 may simply inform the user that the requested task is complete. For example, if the user requested the system to update a record storing some information, the online system 120 sends a response to the user letting the user know that the record is updated.

FIG. 5 is a flow chart illustrating the process of selecting entities from entity pools, according to an embodiment. The conversation engine 150 selects 510 an entity type that is mapped to the task requested by the user. The conversation engine 150 executes 520 the methods specified in the entity configuration to determine an entity pool representing a set of entities of the entity type. An example, of entity pools determined based on user utterances is as follows: {entity_type1: [candidate11, candidate12, . . . ,], entity_type2: [candidate21, candidate22, . . . ,], . . . }. This pool includes entity types entity_type1 and entity_type2. For entity type entity_type1, the entity pool includes as set of candidate entities [candidate11, candidate12, . . . ,] and for entity type entity_type2, the entity pool includes as set of candidate entities [candidate21, candidate22, . . . ,].

In an embodiment, a method specified in the entity configuration for an entity type is associated with a model, for example, a machine learning based model such as a neural network. The conversation engine 150 executes the models to determine the entity based on the sentence received as an utterance. The conversation engine 150 may use models such as a part of speech tagger, named entity recognition model, coreference resolution model, and so on.

In an embodiment, the conversation engine 150 tracks entities identified based on previous utterances received from the user during a conversation with the user. The conversation engine 150 adds the entities determined based on the current utterance to the entities determined from previous utterances to determine the entity pool for the entity type.

If the entity pool includes more than one entities, the conversation engine 150 filters 530 out entities from the entity pool based on hints specified in the entity configuration for the entity type. The conversation engine 150 eliminates entities until a single entity is left for the entity type in the entity pool. Accordingly, the number of entities in each entity pool may decrease. For example, the above example entity pool may get updated to {entity_type1: [candidate11], entity_type2: [candidate21], . . . }. The conversation engine 150 selects 540 the remaining entity as the entity for that entity type and provides to the task execution module 350 for executing the task. The task execution module 350 execute the task once the entities of each entity type is available.

In embodiments in which the task execution module 350 maintains a task data structure, the task execution module 350 updates the task object corresponding to the current task with values of entities determined. The task execution module 350 executes the task once all slots representing the entity values for the task are filled.

If after filtering the entities from an entity pool, the conversation engine 150 determines that there are more than one entity in the entity pool, the conversation engine 150 generates a question for asking the user, which entity value is the correct one. The conversation engine 150 sends the generated question to the user as part of the chatbot conversation.

In an embodiment, the entity configuration specifies the methods for each entity type in a specific order and the conversation engine 150 attempts to obtain the value of the entity in the order of methods specified in the entity configuration. For example, the conversation engine 150 executes the first method to determine the value of the entity. If the method succeeds, the conversation engine 150 uses the determined value of the entity. If the method fails to provide a value of the entity, the conversation engine 150 executes the next method, and so on until the value of the entity is determined.

In an embodiment, the entity configuration specifies hints for filtering out candidate entities from an entity pool. A hint may specify a data types for the entity, for example, integer, string, float, and so on. The conversation engine 150 checks each candidate entity against the specified types and removes the candidate entities from the entity pool that fail to match the specified type.

In an embodiment, the entity configuration specifies possible names for named entities corresponding to an entity type. For example, for a zip_code entity type, the entity configuration specifies potential names "ZIPCODE", "zipcode", "number", and so on. These represent names that a named entity recognition model may assign to an entity of that entity type. These names may be obtained from analysis of previous conversations from users. The conversation engine 150 identifies named entities determined during previous utterances that have names matching the potential names specified in the entity configuration. The conversation engine 150 adds named entities with matching names to the entity pool for the entity type.

Computer Architecture

Figure 6:
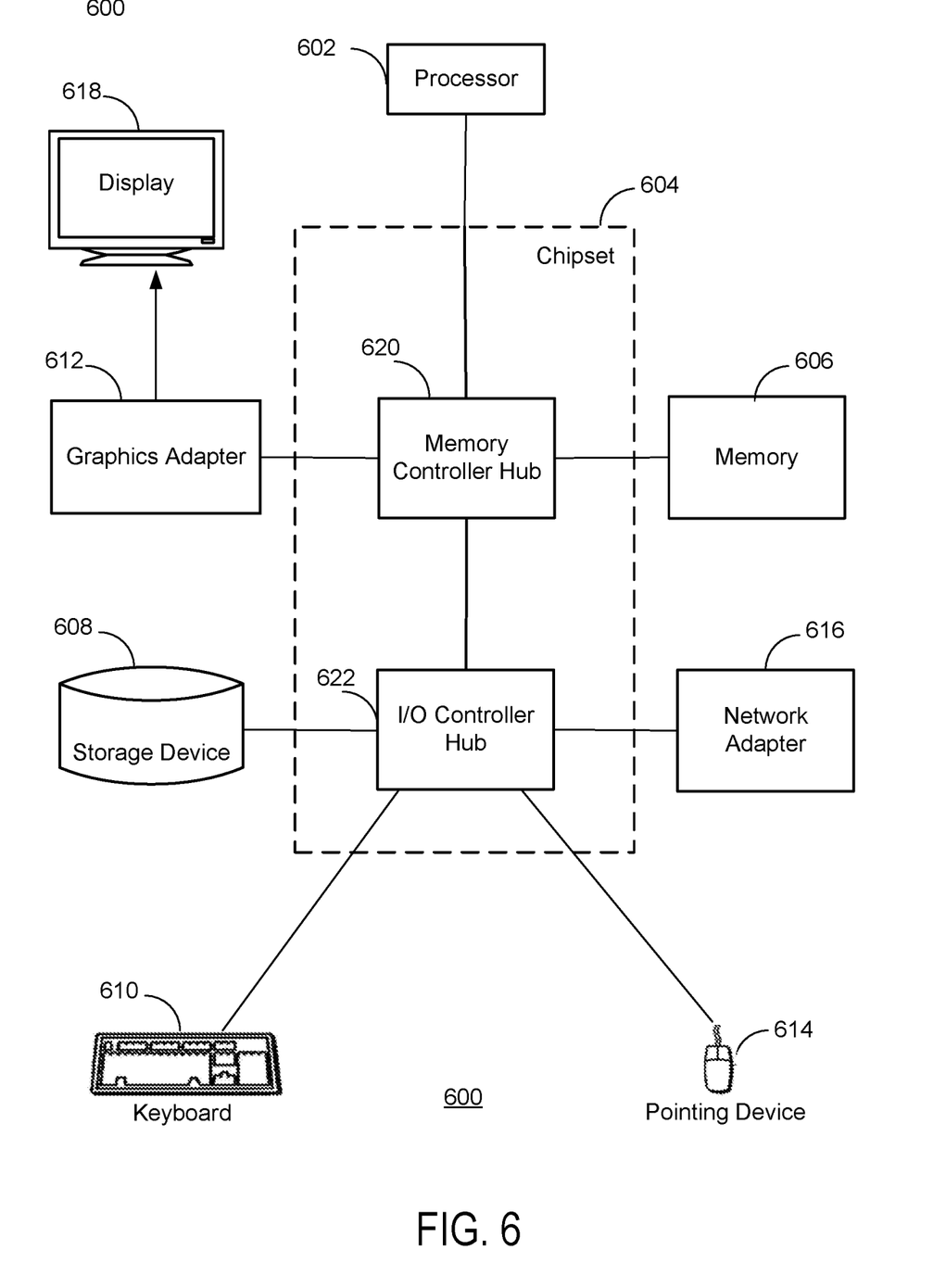
FIG. 6 is a block diagram illustrating a functional view of a typical computer system according to one embodiment.

FIG. 6 is a high-level block diagram illustrating a functional view of a typical computer system for use as one of the entities illustrated in the environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 acting as an online system 120 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device 115 may be a mobile phone with limited processing power, a small display 618, and may lack a pointing device 614. The online system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols.

Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for determining intent of a user in a chatbot conversation, the method comprising:
   receiving a task configuration mapping tasks to entity types;
   receiving an entity configuration mapping entity types to methods for determining entities of each entity type, the entity types including at least one entity type corresponding to entity values associated with users;
   receiving a natural language sentence from a user in a chatbot conversation;
   predicting an intent of the natural language sentence using an intent detection model, the intent detection model being trained over a neural network using a labeled data set comprising natural language requests, the intent representing a task requested by the user via the natural language sentence;
   identifying one or more entity types corresponding to the requested task from the task configuration;
   for at least one identified entity type, determining an entity value of the entity type by executing the methods corresponding to the entity type specified in the entity configuration, the entity value being associated with the user;
   performing the requested task based on the determined entity value; and
   sending a response based on the performed task to the user in the chatbot conversation.

2. The method of claim 1, wherein determining an entity value of an entity type comprises:
   determining an entity pool comprising one or more candidate entity values; and
   eliminating one or more entity values from the entity pool based on one or more hints specified in the entity configuration.

3. The method of claim 2, wherein a hint specifies a data type for the entity type, wherein an entity value is eliminated responsive to determining that the entity type has a data type different from the data type specified as the hint.

4. The method of claim 2, further comprising:
   determining whether an entity pool has a plurality of entity values;
   responsive to the entity pool including a plurality of entity values, generating a question for confirming the entity value with the user; and
   sending the generated question to the user.

5. The method of claim 1, wherein an entity configuration specifies one or more names for an entity type, the method further comprising:
   selecting a name based on a user utterance that has a name matching the one or more names specified for the entity type in the entity configuration, the selected name determined based on a named entity recognition model; and determining the entity value based on a value of the selected name.

6. The method of claim 1, wherein the intent detection model comprises a neural network configured to receive an input sentence and an example sentence and output a score based on a match between the input sentence and the example sentence.

7. The method of claim 6, wherein predicting the intent of the natural language sentence comprises:

comparing the received natural language sentence with each of a set of example sentences; and selecting the intent corresponding to one or more examples determined to match the received natural language sentence based on the comparison.

8. The method of claim 6, further comprising:

receiving a chatbot configuration specifying a set of candidate intents, wherein a candidate intent corresponds to a task performed by an online system in response to user requests received via the chatbot;

wherein the chatbot configuration specifies a set of example sentences for each candidate intent and the intent detection model determines the intent of the received natural language sentence by using the neural network to match the received natural language sentence with example sentences for candidate intents specified in the chatbot configuration.

9. The method of claim 6, further comprising:

training the neural network using training dataset including example sentences with known intents.

10. The method of claim 1, wherein the method is performed by an online system, and the online system is a multi-tenant system hosting data and services for a plurality of tenants, wherein the chatbot configuration is specific to a tenant that performs a set of tasks using the multi-tenant system, each task from the set of tasks corresponding to a candidate intent specified in the chatbot configuration.

11. The method of claim 1, further comprising:

maintaining, by an online system, a set of tasks based on the conversation with the user, wherein a task from the set of tasks corresponds to an intent determined from a user utterance; and selecting a task from the set of tasks and performing the task.

12. A non-transitory computer readable storage medium storing instructions that when executed by a computer processor, cause the computer processor to perform steps for determining intent of a user in a chatbot conversation, the steps comprising:

receiving a task configuration mapping tasks to entity types;

receiving an entity configuration mapping entity types to methods for determining entities of each entity type, the entity types including at least one entity type corresponding to an entity values associated with users;

receiving a natural language sentence from a user in a chatbot conversation;

predicting an intent of the natural language sentence using an intent detection model, the intent detection model being trained over a neural network using a labeled data set comprising natural language requests, the intent representing a task requested by the user via the natural language sentence;

identifying one or more entity types corresponding to the requested task from the task configuration;

for least one identified entity type, determining an entity value of the entity type by executing the methods corresponding to the entity type specified in the entity configuration, the entity value being associated with the user;

performing the requested task based on the determined entity value; and sending a response based on the performed task to the user in the chatbot conversation.

13. The non-transitory computer readable storage medium of claim 12, wherein determining an entity value of an entity type comprises:

determining an entity pool comprising one or more candidate entity values; and eliminating one or more entity values from the entity pool based on one or more hints specified in the entity configuration.

14. The non-transitory computer readable storage medium of claim 13, wherein the instructions further cause the computer processor to perform steps comprising:

determining whether an entity pool has a plurality of entity values;

responsive to the entity pool including a plurality of entity values, generating a question for confirming the entity value with the user; and sending the generated question to the user.

15. The non-transitory computer readable storage medium of claim 13, wherein an entity configuration specifies one or more names for an entity type, wherein the instructions further cause the computer processor to perform steps comprising:

selecting a name based on a user utterance that has a name matching the one or more names specified for the entity type in the entity configuration, the selected name determined based on a named entity recognition model; and determining the entity value based on a value of the selected name.

16. The non-transitory computer readable storage medium of claim 12, wherein the intent detection model comprises a neural network configured to receive an input sentence and an example sentence and output a score based on a match between the input sentence and the example sentence.

17. The non-transitory computer readable storage medium of claim 16, wherein predicting the intent of the natural language sentence comprises:

comparing the received natural language sentence with each of a set of example sentences; and selecting the intent corresponding to one or more examples determined to match the received natural language sentence based on the comparison.

18. The non-transitory computer readable storage medium of claim 16, wherein the instructions further cause the computer processor to perform steps comprising:

receiving a chatbot configuration specifying a set of candidate intents, wherein a candidate intent corresponds to a task performed by an online system in response to user requests received via the chatbot;

wherein the chatbot configuration specifies a set of example sentences for each candidate intent and the intent detection model determines the intent of the received natural language sentence by using the neural network to match the received natural language sentence with example sentences for candidate intents specified in the chatbot configuration.

19. The non-transitory computer readable storage medium of claim 12, wherein the computer processor is a part of an online system, and the online system is a multi-tenant system hosting data and services for a plurality of tenants, wherein the chatbot configuration is specific to a tenant that performs a set of tasks using the multi-tenant system, each task from the set of tasks corresponding to a candidate intent specified in the chatbot configuration.

20. A computer system comprising:
   a computer processor; and
   a non-transitory computer readable storage medium storing instructions that when executed by a computer processor cause the computer processor to perform steps comprising:
      receiving a task configuration mapping tasks to entity types;
      receiving an entity configuration mapping entity types to methods for determining entities of each entity type, the entity types including at least one entity type corresponding to entity values associated with users;
      receiving a natural language sentence from a user in a chatbot conversation;
      predicting an intent of the natural language sentence using an intent detection model, the intent detection model being trained over a neural network using a labeled data set comprising natural language requests, the intent representing a task requested by the user via the natural language sentence;
      identifying one or more entity types corresponding to the requested task from the task configuration;
      for at least one identified entity type, determining an entity value of the entity type by executing the methods corresponding to the entity type specified in the entity configuration, the entity value being associated with the user;
      performing the requested task based on the determined entity value; and
      sending a response based on the performed task to the user in the chatbot conversation.

* * * * *

UNITED STATES PATENT AND TRADEMARK OFFICE
CERTIFICATE OF CORRECTION

| | | |
|---|---|---|
| PATENT NO. | : 11,651,158 B2 | Page 1 of 1 |
| APPLICATION NO. | : 16/993256 | |
| DATED | : May 16, 2023 | |
| INVENTOR(S) | : Yang et al. | |

It is certified that error appears in the above-identified patent and that said Letters Patent is hereby corrected as shown below:

In the Claims

In Column 16, in Claim 12, Line 1, delete "for least" and insert -- for at least --, therefor.

Signed and Sealed this
Twenty-ninth Day of August, 2023

*Katherine Kelly Vidal*

Katherine Kelly Vidal
*Director of the United States Patent and Trademark Office*